United States Patent [19]

Koyama

[11] Patent Number: 4,926,080
[45] Date of Patent: May 15, 1990

[54] LINEAR ACTUATOR SCREW CONNECTED WITH PARALLEL LINEAR BEARING

[76] Inventor: Satoru Koyama, 29-20, Kotubo 1-chome, Zushi-shi Kanagawa-ken, Japan, 249

[21] Appl. No.: 276,782

[22] Filed: Nov. 28, 1988

Related U.S. Application Data

[63] Continuation-in-part of Ser. No. 52,736, filed as PCT JP86/00436 on Aug. 26, 1986, abandoned.

[51] Int. Cl.⁵ .......................... F16D 1/06; H02K 7/06
[52] U.S. Cl. ........................................ 310/80; 74/447; 74/424.8 NA; 403/370
[58] Field of Search ................ 74/424.8 R, 424.8 NA, 74/447, 459; 248/666; 310/80, 83, 91; 403/356, 368, 370

[56] References Cited

U.S. PATENT DOCUMENTS 3,638,974  2/1972  Stratienko ............................ 403/370
3,987,323 10/1976  Hess ..................................... 310/80
4,295,753 10/1981  Luerkin et al. ....................... 74/447
4,364,687 12/1982  Adell .................................... 403/370

FOREIGN PATENT DOCUMENTS 48-7207  1/1973  Japan ................................... 310/80

Primary Examiner—Peter S. Wong
Assistant Examiner—D. L. Rebsch
Attorney, Agent, or Firm—Henry C. Nields

[57] ABSTRACT

A linear actuator comprising a stepping motor having a hollow motor shaft prevented from moving in a thrust direction and a flange on either shaft end, a screw extending through the hollow shaft, a nut connected to the motor shaft with a coupling and rotated to linearly move the screw. A plate member is mounted upon screw and a bar so as to connect them to each other, said screw and said bar passing through and being supported by a motor flange, said bar moving through a bearing of a holder mounted to the plate member such that the holder is in parallel to the screw.

4 Claims, 4 Drawing Sheets

LINEAR ACTUATOR SCREW CONNECTED WITH PARALLEL LINEAR BEARING

This application is a continuation-in-part of application Ser. No. 052,736, filed as PCT JP86/00436 on Aug. 26, 1986, now abandoned.

BACKGROUND OF THE INVENTION

1. Field of the Invention

The present invention relates to stepping motors and the use thereof with a hollow shaft and a ball slide in order to provide a linear actuator. By the term "ball slide" I mean to include apparatus such as a tubular housing having ball bearings at the inside surface thereof within which a bar may be moved longitudinally in contact with the ball bearings.

2. Description of the Prior Art

Conventional linear actuators make use of a stepping motor which imparts rotary movement to a screw. A nut surrounding the screw and restrained from rotation is given linear movement by the rotation of the screw. Alternatively, an electric motor can be used to rotate a nut. A screw which is engaged by the nut is given linear movement by the rotation of the nut.

Each such system requires a specific nut and a specific screw suitable for use with the specific nut. This requirement is not desirable, because various grades of screws are commercially available at present and a given stepping motor should be usable with a variety of screws.

An example of conventional linear actuator is shown in U.S. Pat. No. 4,693,131 to Teramachi.

SUMMARY OF THE INVENTION

An objective of the present invention is to provide a motor structure which can be used as part of an actuator structure, wherein various commercially available screws may be accomodated simply by changing couplings. This is accomplished by providing the motor with a hollow shaft the end of which is tapered and coupled to a member (such as a nut) which is threaded to receive a screw. The motor is also provided with a flange structure at either axial mounting face. An apertured plate member adapted to be connected to the flange structure is provided, so that a ball slide may easily be arranged in parallel with the motor shaft. Consequently, the motor is suitable for use as part of a linear actuator having a very simple structure.

The stepping motor of the invention may be used to accurately measure the angle of rotation of the nut 5 by measuring the linear displacement of the screw 4. In the present invention, this is done without rotating the screw, thus avoiding the limitation from the screw, resulting in a high speed stepping motor. The motor itself provides support for the actuator, this providing an accurate and simple linear actuator.

DESCRIPTION OF PREFERRED EMBODIMENTS

Figure 1:
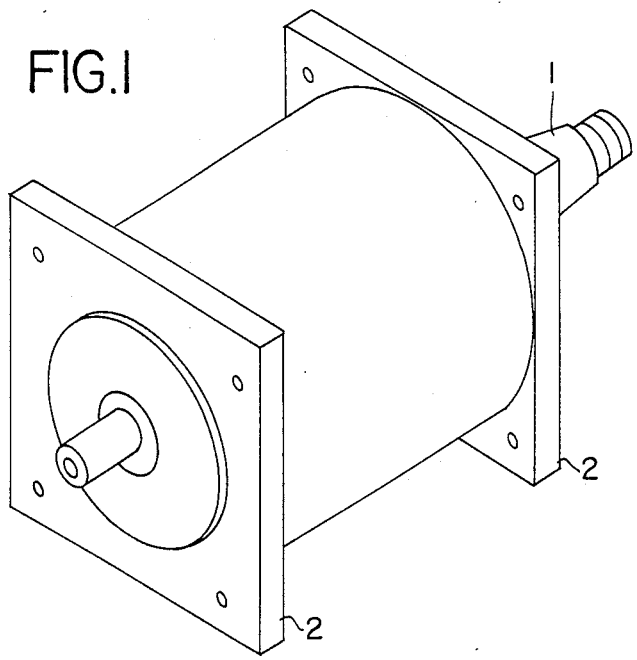
FIG. 1 is a perspective view of a stepping motor having a hollow shaft.
Figure 2:
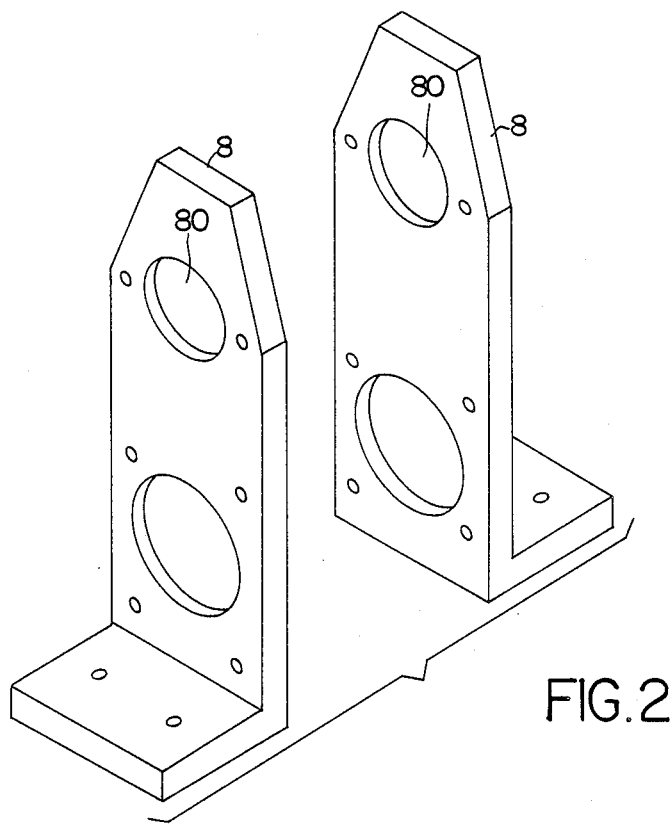
FIG. 2 illustrates a member for assembling a motor and a linear ball bearing holder.
Figure 3:
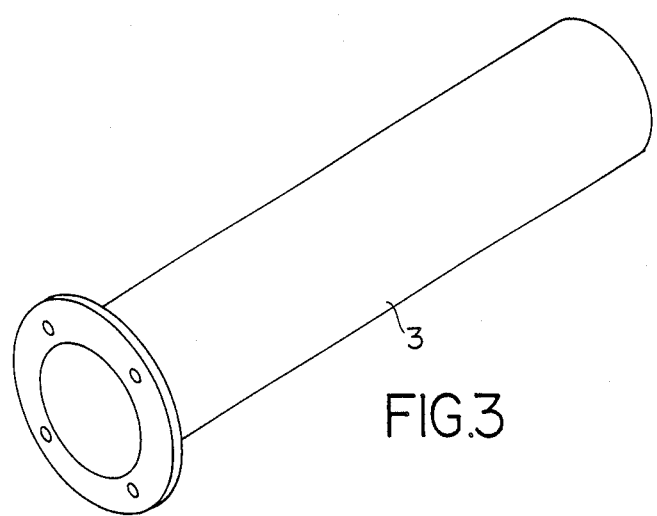
FIG. 3 illustrates a linear ball bearing holder.

FIG. 1 illustrates a stepping motor structure for use in accomplishing the objective of the present invention. It is essential to accomplish the objective with a multi-purpose structure having as few components as possible. As shown in the drawings, the motor has a flange structure 2 on each face thereof and a hollow motor shaft 1 through which a screw 4 extends. A nut 5 is connected to the motor shaft 1 through a coupling 6 and rotated to convert the rotation of the nut into a linear motion of the screw. The motor shaft is tailored in a tapered shaft structure for complete connection and co-axial relationship, because the rotation of the motor must be transmitted without causing eccentricity. In addition, in order to prevent the motor from moving in a thrust direction, the motor has a bearing 7 (shown in FIG. 6) the inner race of which is secured to the motor shaft 1, and the outer race of which is secured to the case 27 of the motor. In accordance with the invention the motor per se is utilized as a strength-providing member, and this is advantageous. Used in this embodiment is an apertured plate member 8 as shown in FIG. 2 to which the motor is secured, so that the motor looks as if it has legs. In addition, the member has a hole 80 through which a holder 3 of a linear ball bearing as shown in FIG. 3 is mounted to the member. A bar 9 which matches the bearing within the holder 3 extends through the holder 3 in parallel to the screw 4 extending through the hollow shaft 1 of the motor.

Figure 4:
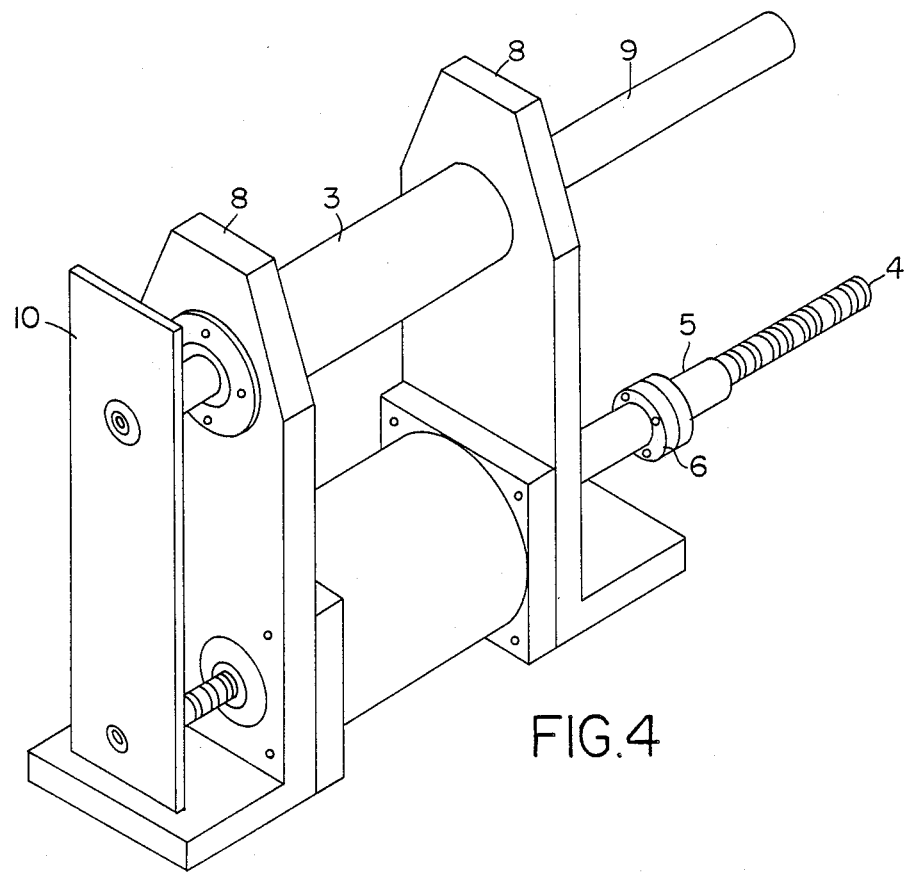
FIG. 4 illustrates a linear actuator constructed according to the present invention.
Figure 5:
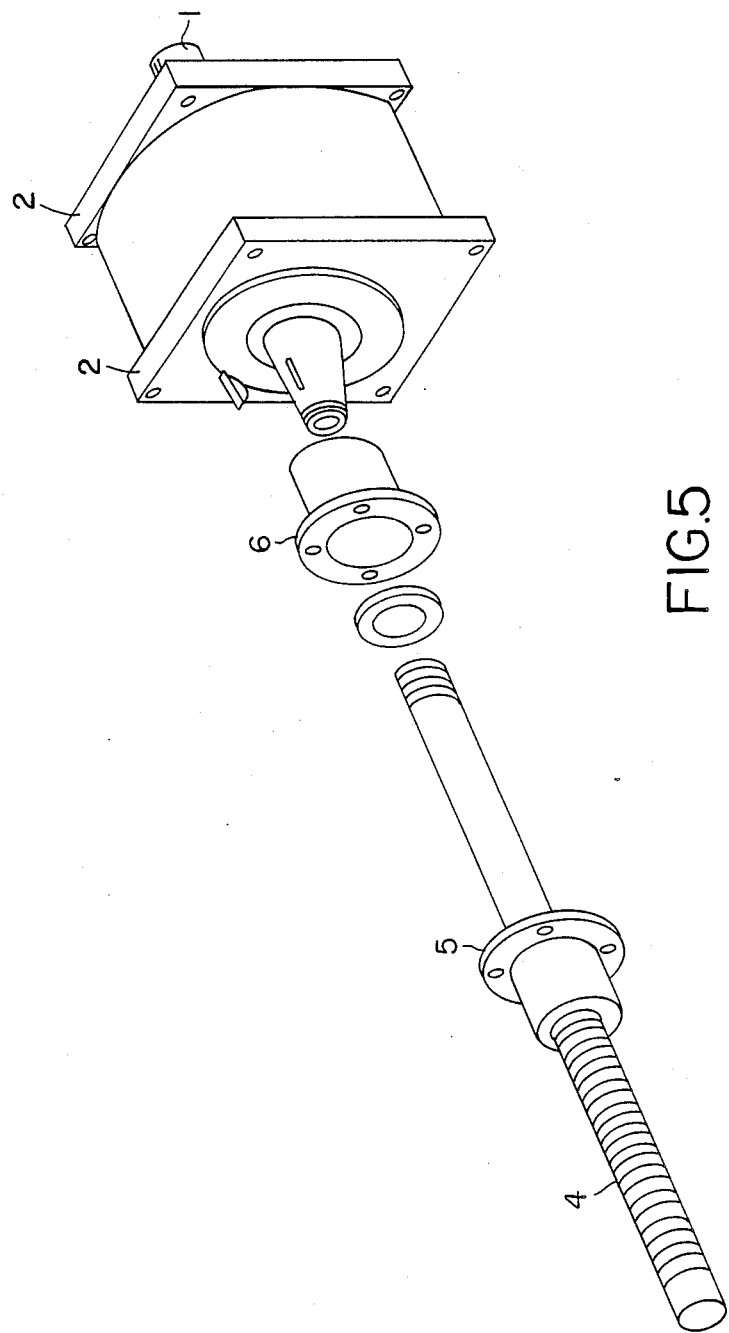
FIG. 5 illustrates the motor of FIG. 4 and the tapered hollow shaft thereof.

As shown in FIG. 4, bar 9 and screw 4 are connected to each other through a connecting member 10 to which another member can be mounted. That is to say, the structure of the invention provides a connecting member 10 upon which the article to which it is desired to impart precise movement can be mounted.

Figure 6:
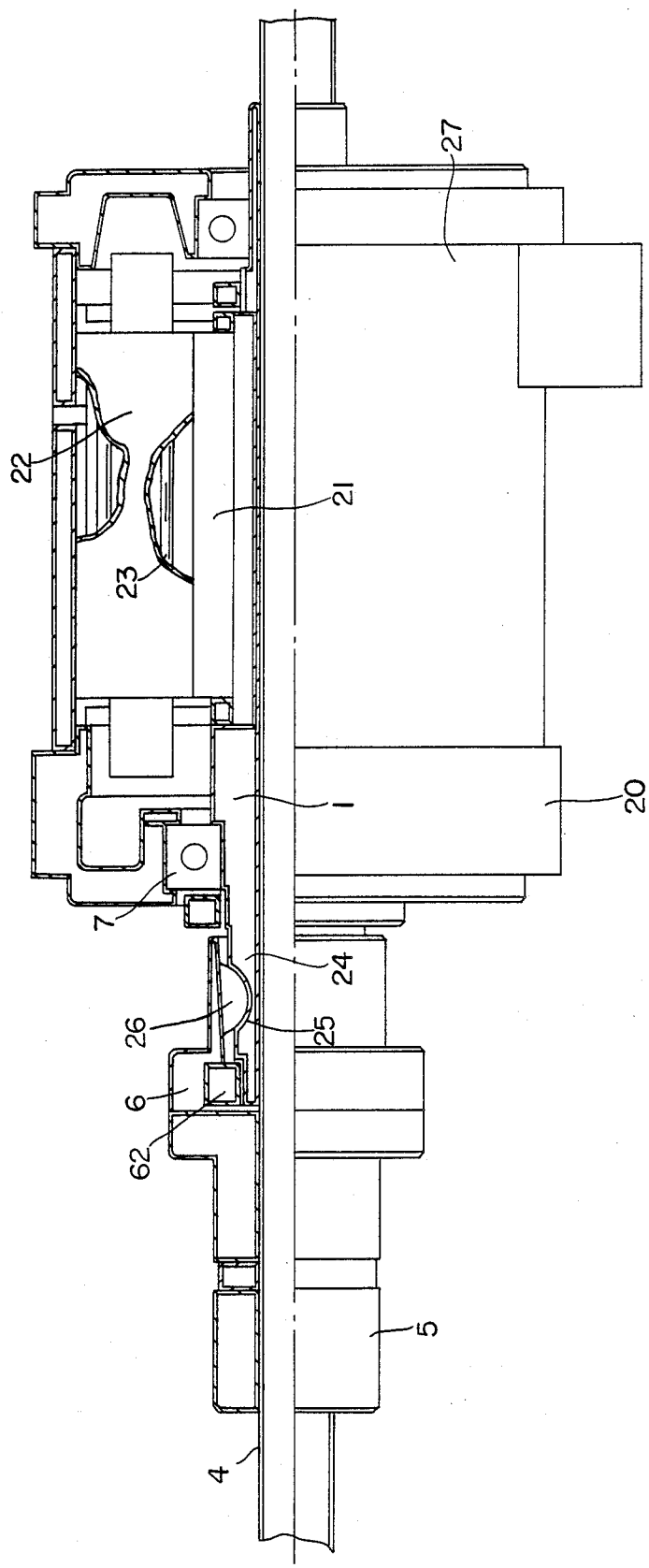
FIG. 6 is an axial cross section which illustrates the motor of FIG. 4 in greater detail.

The stepping motor structure shown in FIG. 1 is shown in greater detail in FIG. 6. Referring now to FIG. 6, the apparatus of the invention includes a motor 20 which may be of the type shown in U.S. Pat. No. 4,588,913 to Adami and Japanese Patent Publication No. 48-7207 to Hisashi. The rotor 21 of the motor 20 is rotatably supported within the stator 22, and activation of the motor by a suitable power source (not shown) causes rotation of the rotor 21. The rotor 21 includes suitable coils 23. The hollow shaft 1 is supported upon and within the rotor 21 on the inside thereof, so that rotation of the rotor 21 rotates the hollow shaft 1. The ball screw 4 of the ball nut/screw component extends through the hollow shaft 1, and the nut 5 of the ball nut/screw component is mounted on the rotor through the coupling 6. One end 24 of the hollow shaft 1 has a tapered structure; that is to say, the outer surface of one end 24 of the hollow shaft 1 is tapered so as to receive the coupling 6. The tapered end 24 of the shaft 1 has a slot 25 in the outer periphery thereof which is adapted to receive a crescent insert key 26. The inner surface of the coupling 6 is tapered so as to match the taper of the outer surface of the tapered end 24 of the hollow shaft 1. Thus the coupling 6 may be said to have a horn-shaped concave portion. When the apparatus is assembled, the ball nut/screw component is moved, so that the ball screw 4 passes through the hollow shaft 1, while the nut 5, which has been bolted or otherwise affixed to the coupling 6, is moved towards the motor 20 so that the hollow inner surface of the coupling 6 passes over the crescent key 26 so as to hold it in place. A nut 62 provides the primary support for the coupling 6, and it is the principal function of the key-slot arrangement to cause rotary motion of the hollow shaft 1 to be imparted to the ball nut 5 via the coupling 6. The hollow shaft 1 itself is supported upon bearings 7, each inner race of which is affixed to the hollow shaft 1 and each outer race of which is affixed to the case 27 of the motor. The motor 20 is of the stepper-motor type, and thus is capable of imparting small, discrete rotary movements of the hollow shaft 1. The ball nut/screw component, activated by the rotary movement of the hollow shaft 1, imparts very small, accurate, discrete movements to the ball screw 4. The nut 5 has a screw portion in its inner wall which is engaged with the screw 4 via balls (not shown) as in conventional ball nut/screw articles.

Because of the coupling 6, various screw shafts having various diameters or pitches or both can be adapted to the motor of the invention by only changing the nut 5. Moreover, the motor of the invention can also utilize standard ball nut/screw components available on the market. Such standard components are so assembled that the nut is engaged with the ball screw and cannot be disengaged. Furthermore, the motor of the invention can be utilized as an ordinary motor because the end of the rotating motor shaft is exposed and free to be connected to other members.

I claim:

1. A linear actuator comprising in combination (a) a stepping motor having flanges on both faces in the axial direction of said motor for connecting with other devices and a hollow motor shaft the end of which is tapered to receive a coupling for application of a screw and (b) the coupling adapted to couple said shaft to means for causing rotation of said shaft to produce linear movement of said screw, an apertured plate member mounted on each said motor face through said flanges, a holder of a linear ball bearing mounted upon said apertured plate members in parallel to said motor shaft, a screw extending through said hollow motor shaft, and a bar extending through said bearing holder, wherein said bar and screw are connected to each other at an end thereof through a connecting member.

2. A stepping motor for a linear actuator comprising in combination a motor case, a hollow shaft rotatably supported within said motor case and defining an axis of rotation, an electric motor within said motor case surrounding said hollow shaft and having a rotor adapted to rotate said hollow shaft, said motor case having flanges adapted for connection with apparatus auxiliary to said stepping motor, said hollow shaft having a tapered end projecting from said motor case and adapted for connection to apertured members of various aperture diameters via a coupling having a horn-shaped concavity, said hollow shaft being adapted to receive therein a ball screw coacting with a ball nut.

3. A stepping motor structure comprising, in combination with a stepping motor according to claim 2, a coupling having a horn-shaped concavity adapted for attachment to said tapered end, a ball nut/screw article having a ball screw adapted for cooperation with said hollow shaft and a ball nut adapted for attachment to said coupling.

4. A linear actuator comprising, in combination with a stepping motor structure according to claim 3, a ball slide having a bar and a tubular housing, said bar having one end rigidly connected to said ball screw, said tubular housing being rigidly connected to said flanges, whereby linear movement of said ball screw is imparted to said bar.

* * * * *